Feb. 24, 1970 G. A. KENT ET AL 3,497,615

TELEVISION VERTICAL OSCILLATOR AND BLANKING CIRCUIT

Filed Oct. 3, 1966 2 Sheets-Sheet 1

INVENTORS
GEORGE A. KENT
RICHARD J. WARING
PENDLETON, NEUMAN
SEIBOLD & WILLIAMS
ATTORNEYS

TELEVISION VERTICAL OSCILLATOR AND BLANKING CIRCUIT

Filed Oct. 3, 1966 2 Sheets-Sheet 2

INVENTORS
GEORGE A. KENT
RICHARD J. WARING
PENDLETON, NEUMAN
SEIBOLD & WILLIAMS
ATTORNEYS

United States Patent Office 3,497,615
Patented Feb. 24, 1970

3,497,615
TELEVISION VERTICAL OSCILLATOR AND BLANKING CIRCUIT

George A. Kent, Fort Wayne, and Richard J. Waring, Auburn, Ind., assignors to The Magnavox Company, Fort Wayne, Ind., a corporation of Delaware
Filed Oct. 3, 1966, Ser. No. 583,541
Int. Cl. H04n 3/16
U.S. Cl. 178—7.3 7 Claims

ABSTRACT OF THE DISCLOSURE

A television vertical deflection and blanking circuit is disclosed having transistorized blocking oscillator, driver, and output stages. The oscillator has an isolation diode coupled to the oscillator input increasing its input impedance and thereby enabling simplification of the circuit coupling it to the sync separator. The blocking oscillator transformer has a high turns ratio and large amplitude negative pulses are applied from one end of the secondary winding to the first C.R.T. grid for vertical blanking. The driver stage is an emitter follower amplifier minimizing the current requirements on the blocking amplifier.

Figure 1:
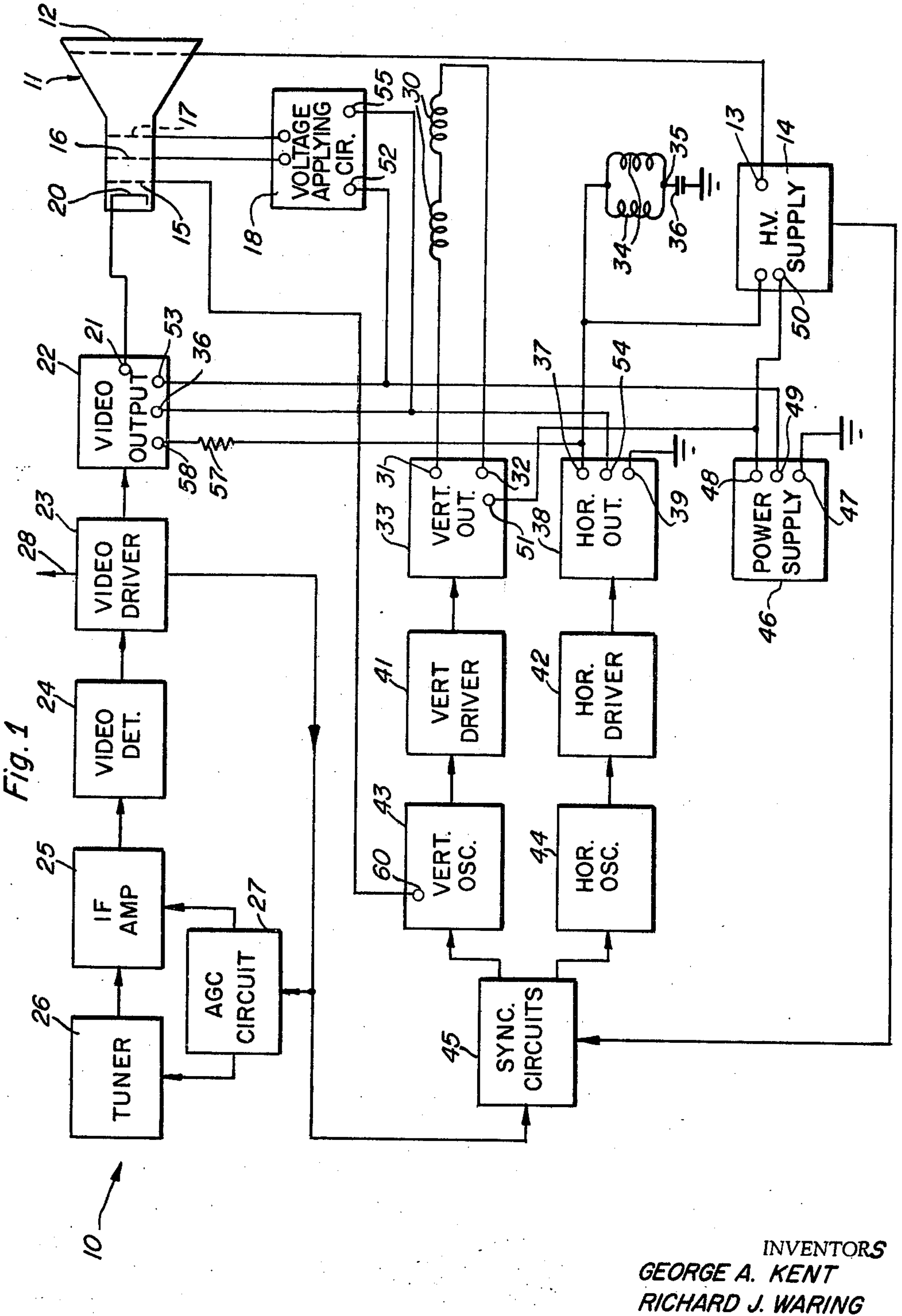

This invention relates to a vertical oscillator and blanking circuit for television receivers and more particularly to a solid state circuit which functions in a highly reliable manner to blank a picture tube during vertical retrace time intervals and to supply a stable signal for operation of a vertical output stage. The circuit is comparatively simple and inexpensive in construction and has a minimum number of component parts.

In order to suppress vertical retrace lines on a television receiver picture tube, it is necessary to apply a large amplitude pulse in the control grid-cathode circuit of the picture tube, a pulse having an amplitude of from 60 to 100 volts being usually required. Pulses of the required magnitude and of the proper polarity for application to the control grid of the picture tube are not always available from the usual vertical deflection circuitry, especially in solid state receivers. It has been heretofore proposed to provide a second winding on a vertical output choke to obtain negative pulses for application to the grid of the picture tube. The provision of such a winding adds substantial expense and the pulses obtained have a wave shape such that a considerable amount of shaping is required. Even then, it is difficult to avoid shading at either the top or the bottom of the picture tube screen. Another proposed arrangement is to apply a positive pulse from the vertical output stage to a point in the video amplifier circuitry such that blanking will occur. Satisfactory results can be obtained with such an arrangement, but difficulties must be overcome because of bilateral characteristics of transistors and problems in synchronization and automatic gain control action. Also, it is necessary to provide circuitry to cut off a ramp portion of the signal obtained from the vertical output stage.

This invention was evolved with the general object of overcoming the disadvantages of prior circuits and of providing a circuit which completely blanks a picture tube during vertical retrace time intervals and which is inexpensive in construction, using a minimum number of component parts.

A further object of the invention is to provide a vertical deflection circuit which develops large amplitude negative blanking pulses for application to a pictcre tube grid and which is highly stable and reliable in operation.

According to this invention, a vertical oscillator stage is provided for supplying a signal to a vertical output stage and for operating to develop large amplitude pulses during vertical retrace time intervals, with coupling means being provided for applying such large amplitude pulses to the electron gun structure for blanking the picture tube during vertical retrace time intervals. Preferably, the large amplitude pulses are of negative polarity and are applied directly to the control grid of the picture tube. With this arrangement, the picture tube can be completely blanked during the vertical retrace time intervals with circuitry which is comparatively simple and inexpensive, having a minumum number of component parts.

According to a specific feature of the invention, the vertical oscillator includes a transistor operative as a blocking oscillator, to develop the blanking pulses and the signal for application to the vertical output stage with a high degree of stability and reliability. The blocking oscillator can be readily locked in synchronism with vertical synchronizing pulses, a simple resistance-capacitance circuit being preferably provided for coupling the synchronizing pulses to the blocking oscillator.

In accordance with a further feature of the invention, the blocking oscillator includes a transformer having a first winding coupled in circuit with the collector electrode of the transistor and a second winding connected in circuit with the base electrode, with the second winding having a substantially larger number of turns than the first winding to develop the large amplitude pulses for application to the picture tube to blank the picture tube during vertical retrace time intervals.

According to another specific feature of the invention, isolation diode means are connected between the second transformer winding and the base electrode of the transistor for operating during conduction of the transistor to apply a signal from the second transformer winding to the base electrode while substantially isolating the synchronizing means from the second winding when the transistor is non-conductive. Thus the synchronizing means operates into a relatively large impedance, and the drive requirements are minimized.

Another important feature of the invention is in the provision of a driver stage between the vertical oscillator stage and the vertical output stage, the driver stage including a transistor operated as an emitter-follower to present a high impedance to the vertical oscillator stage.

Another important feature and advantage of the invention is that very low current demands are placed upon the transistor which is operated as the vertical blocking oscillator, to further increase the stability and reliabiliy of the circuit, while minimizing the expense of construction of the circuit.

Figure 2:
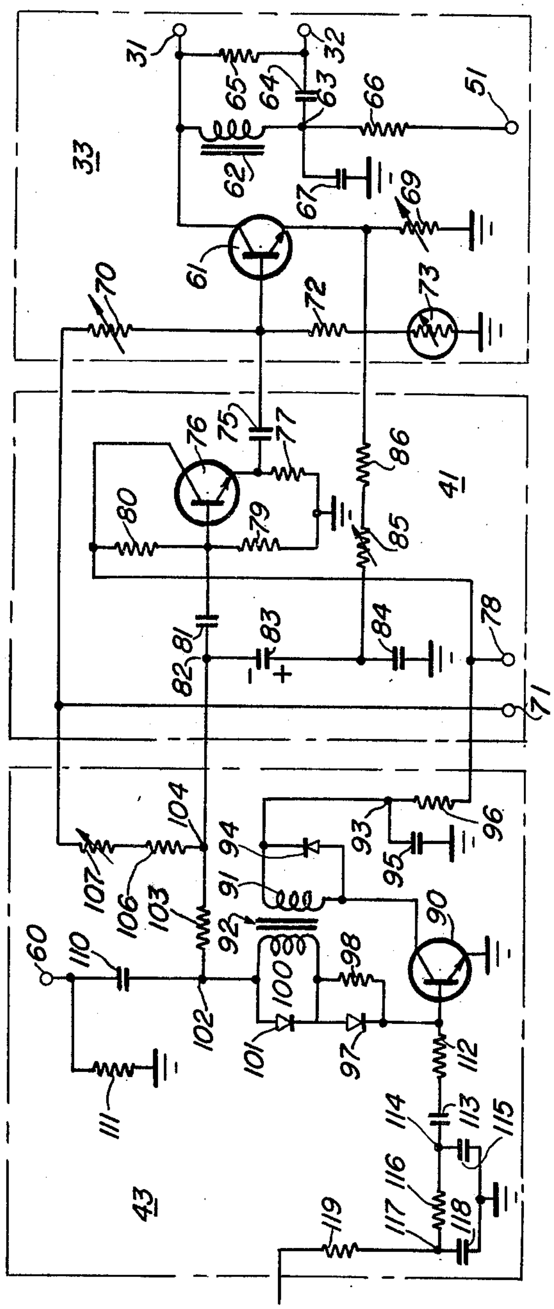
Figure 3:
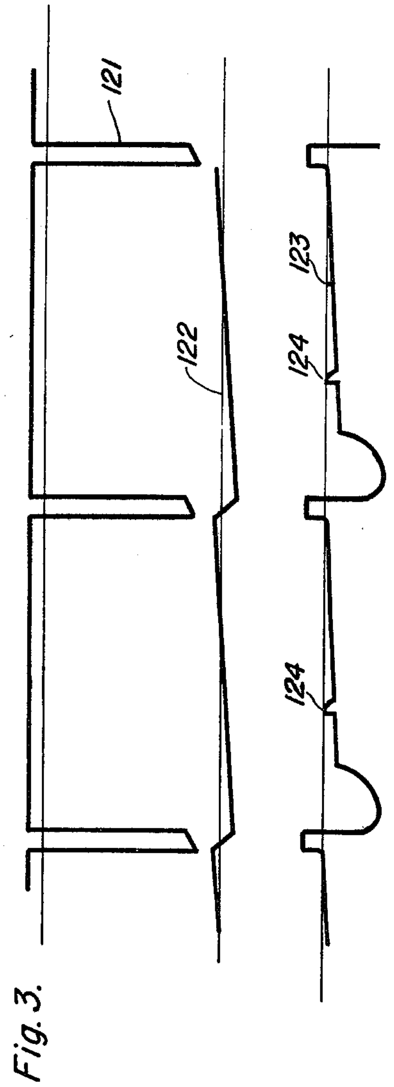

This invention contemplates other objects, features and advantages which will become more fully apparent from the following detailed description taken in conjunction with the accompanying drawings which illustrate a preferred embodiment and in which:

FIGURE 1 is a schematic block diagram of a television receiver constructed in accordance with the principles of this invention;

FIGURE 2 is a circuit diagram showing circuits of a vertical oscillator stage, a vertical driver stage and a vertical output stage and coupling circuits for applying synchronizing signals to the vertical oscillator stage and for applying blanking signals from the oscillator stage to the television picture tube; and FIGURE 3 illustrates waveforms obtainable at certain points of the circuit, for explanation of the operation thereof.

Reference numeral 10 generally designates a television receiver constructed in accordance with the principles of this invention. In general, the receiver 10 comprises a picture tube 11 having a screen 12 which is connected to an output terminal 13 of a high voltage transformer and rectifier circuit 14. The tube 11 has conventional electron gun structure for producing an electron beam to be impinged on the screen 12, including a control grid 15, an accelerating grid 16 and a focusing grid 17. A blanking signal is applied to the control grid 15, as hereinafter described, while the accelerating grid 16 and the focusing grid 17 are connected to a suitable voltage applying circuit 18.

The electron gun of the picture tube 11 further includes a cathode 20 connected to an output terminal 21 of a video output stage 22 which operates to apply an amplified video signal to the cathode 20 to control the intensity of the electron beam produced by the electron gun structure, and to thereby control the brightness of the spot produced on the screen 12. The video output stage 22 receives a video signal from a video driver stage 23 which, in turn, receives a video signal from a video detector 24, the detector 24 being supplied with a signal from an IF amplifier 25 which receives a signal from a conventional tuner 26.

An automatic gain control circuit 27 may be provided, which receives a signal from the video driver stage 23 and which applies gain control signals to the IF amplifier 25 and to the tuner 26. The video driver stage 23 may additionally apply a signal through a line 28 to a sound IF stage, coupled through suitable detector and amplifier circuits to a speaker for reproducing the audio portion of a received signal.

To effect vertical deflection of the beam in the picture tube 11, a pair of vertical deflection coils 30 are connected in series between a pair of output terminals 31 and 32 of a vertical output stage 33. To effect horizontal deflection of the beam, a pair of horizontal deflection coils 34 are connected in parallel between a circuit point 35 which is connected through a capacitor 36 to ground, and an output terminal 37 of a horizontal output stage 38 having a second output terminal 39 which is connected to ground.

The vertical and horizontal output stages 33 and 38 are supplied with signals from vertical and horizontal driver stages 41 and 42 which are supplied with signals from vertical and horizontal oscillator stages 43 and 44 to which synchronizing signals are applied from a synchronizing circuit 45, supplied with a signal from the video driver stage 23 and also supplied with a signal from an output terminal of the high voltage transformer and rectifier circuit 14.

A power supply 46 is provided, having a grounded terminal 47 and having a terminal 48 connected to a terminal 50 of the high voltage transformer and rectifier circuit 14 and to a terminal 51 of the vertical output stage 33. Another terminal 49 is connected to a terminal 52 of the voltage applying circuit 18 and to a terminal 53 of the video output circuit 22. In addition, a power supply circuit may be incorporated in the horizontal output stage 38 having an output terminal 54 connected to a terminal 55 of the voltage applying circuit 18 and to a terminal 36 of the video output circuit 22.

To blank the picture tube during horizontal retrace time intervals, the output terminal 37 of the horizontal output stage 38 may be connected through a resistor 57 to a terminal 58 of the video output stage 22.

This invention is concerned with the vertical deflection circuitry and in accordance with an important feature of the invention, a vertical blanking pulse is developed at an output terminal 60 of the vertical oscillator stage 43, directly coupled to the control grid 15 of the picture tube 11.

Referring to FIGURE 2, the vertical output stage 33 comprises a power transistor 61 having a collector connected to the output terminal 31 and through a choke or inductor 62 to a circuit point 63 which is connected through a coupling capacitor 64 to the output terminal 32, a resistor 65 being connected between terminals 31 and 32. Circuit point 63 is connected through a resistor 66 to the power input terminal 51 and through a by-pass capacitor 67 to ground. The resistor 66 and capacitor 67 together form a decoupling filter, to minimize transient variations at the circuit point 63 and to stabilize the voltage thereof. Capacitor 64 functions as a blocking capacitor to prevent application of DC current components to the deflection coils 30. The inductor 62 provides a path for flow of DC current to the transistor 61 and has an inductance such as to provide a relatively high impedance as compared to the impedance of the deflection or yoke coils 30. During vertical retrace time intervals, a large positive pulse is developed by the inductors 62 and 30 while the current through the coils 30 moves the beam in the picture tube 11 from the bottom of the screen to the top thereof. The resistor 65 reduces the "Q" of the deflection coils 30 to damp out ringing voltages which might otherwise be produced following the retrace pulses.

The emitter of the transistor 61 is connected to ground through an adjustable resistor 69 which serves as a picture height control, by controlling the amount of degeneration in the stage. When the resistance is increased, the degeneration is increased, to reduce the output and to reduce the vertical size of the raster. The resistor 69 also serves to prevent thermal run-away of the transistor 61 which might otherwise occur because as the collector current increases, the temperature of the transistor also increases and causes more collector current to flow and so on. Further, the resistor 69 serves to develop a sawtooth voltage which is applied to a wave shaping circuit as described hereinafter.

The transistor 61 is biased for class A operation. In particular, the base of the transistor 61 is connected through an adjustable resistor 70 to a terminal 71, to which a suitable power supply voltage is applied, and is connected to ground through a resistor 72 and a thermistor 73. Resistor 70 is adjusted to compensate for variations in transistor beta characteristics and to obtain an optimum value of collector current flow through the transistor 61. The thermistor 73 is provided to compensate for temperature changes within the transistor 61, to protect the transistor 61 and to maintain the collector current substantially constant. Preferably, the thermistor 73 is physically associated with the transistor 61 to respond to temperature changes of the transistor 61.

The base of the power transistor 61 is connected through a coupling capacitor 75 to the emitter of a transistor 76 in the driver stage 41, transistor 76 being operated as an emitter-follower. In particular, the emitter of transistor 76 is connected through a resistor 77 to ground while the collector thereof is connected to a terminal 78 to which a suitable power supply voltage is applied. The base of the transistor 76 is connected through a resistor 79 to ground and through a resistor 80 to the power supply terminal 78. The base is additionally connected through a coupling capacitor 81 to a circuit point 82 at which a sawtooth voltage is developed by the oscillator stage 43.

The output waveform from the blocking oscillator 43, developed at the circuit point 82, may be quite non-linear so as not to produce a satisfactory vertical sweep. In the illustrated circuit, a feedback arrangement is provided which may be adjusted to obtain an accurately linear output waveform. In particular, circuit point 82 is connected through capacitors 83 and 84 in series to ground, the junction between capacitors 83 and 84 being connected through an adjustable resistor 85 and a fixed resistor 86 to the emitter of the power transistor 61 in the output stage 33. A parabolic waveform is developed at the junction between capacitors 83 and 84 having an amplitude and phase controlled by adjustment of the resistor 85, the parabolic waveform being added to the oscillator waveform through the capacitor 83 to produce a corrected waveform at the circuit point 82 which when applied through the emitter-follower transistor 76 results in generation of a waveform between output terminals 31 and 32 such as to produce an accurately linear sawtooth waveform of current in the deflection coils 30.

Important features of the invention reside in the circuit of the oscillator stage 43. In particular, the stage 43 comprises a transistor 90 which is operated as a blocking oscillator. The emitter of transistor 90 is connected to ground while the collector thereof is connected through a winding 91 of a transformer 92 to a circuit point 93, a diode 94 being connected in parallel with the winding 91. Circuit point 93 is connected through a capacitor 95 to ground and through a resistor 96 to the power supply terminal 78, the capacitor 95 and the resistor 96 being operative as a decoupling filter.

The base of the transistor 90 is connected through the parallel combination of a diode 97 and a resistor 98 to one end of a second winding 100 of the transformer 92, a diode 101 being connected in parallel with the winding 100.

The opposite end of the winding 100 and the anode of the diode 101 are connected to a circuit point 102 which is connected through a resistor 103 to the circuit point 104 which is connected through a fixed resistor 106 and an adjustable resistor 107 to the power supply terminal 71.

In the operation of the blocking oscillator circuit as thus far described, when the receiver is initially turned on, the transistor 90 is forward biased and the collector current thereof increases. The increasing current flows through the transformer winding 91 and induces a voltage in the winding 100 which has a negative polarity at the upper end thereof which is connected to the circuit point 102, with a positive polarity at the lower end which is connected through the diode 97 and the resistor 98 to the base of the transistor 90. As a result, the transistor 90 rapidly goes into saturation conduction. During this active, a pulse of relatively high amplitude is developed in the secondary winding 100 which is negative at the upper end thereof, connected to the circuit point 102, and through the resistor 103, the capacitor 83 is charged with a polarity as indicated on the drawing.

When the transistor 90 becomes saturated, the collector current thereof ceases to change and the field in the transformer windings becomes constant. The induced voltage in winding 100 thus falls, reducing the primary current. Voltages are then induced across the windings 91 and 100 of reversed polarity, to which diodes 94 and 101 act as short-circuits, to dissipate the energy stored in the transformer 92.

The capacitor 83, however, remains charged and through the winding 100 and the resistor 98, the transistor 90 is cut off. The only discharge path for the capacitor 83 is then through the resistors 106 and 107. The capacitor 83 then discharges toward the supply voltage and after a time interval dependent upon the time constant of the circuit, as determined by the capacitance of the capacitor 83 and the resistance of the resistors 106 and 107, the capacitor 83 becomes positively charged to a value sufficient to forward bias the transistor 90 and to initiate conduction thereof, thereby repeating the cycle.

With such operation of the oscillator circuit, a large amplitude negative pulse is developed at the circuit point 102 during conduction of the transistor 90. In accordance with this invention, the large amplitude pulse so developed is applied through a coupling capacitor 110 to the terminal 60 which is connected to the grid 15 of the picture tube 11, thereby blanking the picture tube 11. As illustrated, the terminal 60 is connected through a resistor 111 to ground, and the DC operating level of the control grid 15 of the picture tube 11 is thereby slightly above ground potential. An appropriate voltage is applied to the video output stage 22, for example to the terminal 53, to establish the proper corresponding DC level of operation of the cathode 20 of the picture tube 11. It will be understood that the resistor 111 can be returned to a point at a potential other than ground potential, with the voltage applied to the video output stage 22 being correspondingly adjusted.

To synchronize the operation of the oscillator 43 with the received signal, the base of the transistor 90 is connected through a resistor 112 and a capacitor 113 to a circuit point 114 forming an output terminal of an integrating circuit, circuit point 114 being connected through a capacitor 115 to ground and through a resistor 116 to a circuit point 117 which is connected through a capacitor 118 to ground and through a resistor 119 to the synchronizing circuit 45. The elements 115, 116, 118 and 119 integrate the synchronizing pulses to develop a pulse at the field rate at the circuit point 114, applied through capacitor 113 and resistor 112 to the base of the transistor 90. The pulse so developed is superimposed on the biasing voltage developed by the capacitor 83 to properly time the starting point of each cycle.

An important feature is that the resistor 98 has a relatively high value and the diode 97 is nonconductive except during conduction of the transistor 90 so that isolation is obtained with a high impedance being presented to the synchronizing pulses.

To obtain proper operation, the resistor 107, which functions as a vertical hold control, is adjusted so that the free-running frequency of the oscillator is slightly lower then the repetition rate of the vertical synchronizing pulses.

Once adjusted, the blocking oscillator 43 operates with a high degree of stability. In achieving such stability, it is important that it operates into a high impedance load such as is presented by the input circuit of the driver stage 41 wherein the transistor 76 is operated as an emitter-follower.

The operation of the circuit and its advantages may be clarified by consideration of its operation with particular component values, it being first noted that by way of illustrative example and not by way of limitation, the components of the illustrated circuit may have the following values:

| Reference numeral: | | Value |
|---|---|---|
| 64 | microfarads | 250 |
| 65 | ohms | 39,000 |
| 66 | do | 22 |
| 67 | microfarads | 100 |
| 69 | ohms | 15 |
| 70 | do | 15,000 |
| 72 | do | 1200 |
| 73 | do | 3000 |
| 75 | microfarads | 250 |
| 77 | ohms | 1000 |
| 79 | do | 100,000 |
| 80 | do | 82,000 |
| 81 | microfarads | 10 |
| 83 | do | 1 |
| 84 | do | 50 |
| 85 | ohms | 200 |
| 86 | do | 33 |
| 95 | microfarads | 200 |
| 96 | ohms | 100 |
| 98 | do | 200,000 |
| 103 | do | 12,000 |
| 106 | do | 82,000 |
| 107 | do | 100,000 |
| 110 | microfarad | 1 |
| 111 | ohms | 22,000 |
| 112 | do | 82,000 |
| 113 | microfarads | 0.033 |
| 115 | do | 0.022 |
| 116 | ohms | 8200 |
| 118 | microfarads | 0.015 |
| 119 | ohms | 10,000 |

The ratio of the number of turns of the winding 100 to the number of turns of the winding 91 is preferably on the order of 4.

With such values, when the transistor 90 is turned on a voltage pulse is generated in the secondary winding 100 having an amplitude of approximately 80 volts and having a duration of approximately 350 microseconds, corresponding to the vertical retrace time interval. With such pulses being developed at the rate of 60 per second and being applied through the capacitor 110 to the terminal 60, a signal is applied to the control grid 15 of the picture tube 11 having a waveform as indicated by reference numeral 121 in FIGURE 3. It is noted that the diode 97 is conductive and the base-emitter circuit of the transistor 90 presents a relatively low resistance, so that almost all of the voltage developed by the transformer secondary 100 appears at the circuit point 102.

During conduction of the transistor 90, capacitor 83 is charged with a polarity as indicated in FIGURE 2 to develop a negative potential at the circuit point 82. When the transistor 90 is rendered non-conductive, the capacitor 83 discharges toward ground potential and is then charged in a reverse direction to produce a positive voltage at the terminal 82. Thus a waveform is produced at terminal 82 as indicated by reference numeral 122 in FIGURE 3, having a peak-to-peak amplitude of 3 volts, and swinging from minus 2 volts to plus 1 volt.

In order to achieve such results, the turns ratio of the transformer 92 should be on the order of 4 as indicated above. The base current of the transistor 90 is then limited by the resistor 103 and with resistor 103 having a value of 12,000 ohms and with an 80 volt signal being developed, the base current is limited to 80 divided by 12,000, or approximately 6.5 milliamperes. Such current is adequate to keep a low beta transistor in saturation.

When the transistor 90 turns off, a voltage is no longer developed in the secondary winding 100, so that the voltage that appears on the base of the transistor 90 is the negative voltage developed across the capacitor 83, which is applied through the resistor 103 and the resistor 98. At this point, the capacitor 83 starts to charge toward the supply voltage through the resistors 106 and 107 and at the time that the base of the transistor 90 starts to go positive, the transistor 90 is turned on and the cycle repeats itself.

It further can be noted that for positive synchronizing pulses looking into the base circuit of the transistor 90 while the transistor is cut off, the transistor appears open and the only load on the synchronizing pulse supplying circuit is the resistor 98 which may preferably have a relatively high value on the order of 200,000 ohms as indicated above. Thus the vertical synchronizing pulses look into an extremely high impedance which imposes minimum demands upon the drive circuitry.

The waveform produced at the base of the transistor 90 is indicated by reference numeral 123 in FIGURE 3, wherein vertical synchronized pulses 124 are shown as they appear during the non-synchronizing operation, so as to indicate the operation into a high impedance. During synchronized operation, the vertical synchronizing pulses are effectively merged into the above-ground portions of the signal, produced when the transistor 90 is rendered conductive.

The circuit thus operates to develop a linear sawtooth voltage at the circuit point 82 which may have an amplitude on the order of 3 volts peak-to-peak with the above-mentioned values, and which is fed into the high input impedance of the emitter-follower driver stage 41. The circuit also supplies a large amplitude negative pulse to the control grid 15 of the picture tube 11, which may be on the order of 80 volts peak-to-peak with the above-described values, and which is more than adequate to completely blank the picture tube during the vertical retrace time intervals.

The circuit additionally presents a very high input impedance to the positive synchronizing pulses and thus permits a relatively high impedance integrating circuit.

It will be understood that modifications and variations may be effected without departing from the spirit and scope of the novel concepts of this invention.

We claim as our invention:

1. In a television circuit including a picture tube having an electron gun structure for producing an electron beam and horizontal and vertical deflection means for deflecting said beam, horizontal and vertical deflection circuits for operating said horizontal and vertical deflection means, said vertical deflection circuit including a vertical output stage and a vertical oscillator stage for supplying a signal to said vertical output stage and operative to develop large amplitude pulses during vertical retrace time intervals, said vertical oscillator including a transistor having base, emitter and collector electrodes and operated as a blocking oscillator, a transformer having first and second windings, and means coupling said first winding in circuit with said collector electrode and said second winding in circuit with said base electrode, said second winding having a substantially larger number of turns than said first winding to develop said large amplitude pulses across said second winding during conduction of said transistor, and coupling means connected in circuit with said second winding for applying said large amplitude pulses to said electron gun structure for blanking said picture tube during vertical retrace time intervals.

2. In a television circuit as defined in claim 1, means for applying synchronizing pulses to said base electrode, and isolation diode means connected between said second transformer winding and said base electrode for operating during conduction of said transistor to apply a signal from said second winding to said base electrode while substantially isolating said synchronizing means from said second winding when said transistor is non-conductive.

3. In a television circuit including a picture tube having an electron gun structure for producing an electron beam and horizontal and vertical deflection means for deflecting said beam, DC power supply means, horizontal and vertical deflection circuits for operating said horizontal and vertical deflection means, said vertical deflection circuit including a vertical output stage and a vertical oscillator stage for applying a signal to said vertical output stage and being operative to develop large amplitude pulses during vertical retrace time intervals, said vertical oscillator including a transistor having base, emitter and collector electrodes and operated as a blocking oscillator, means connecting said emitter electrode to said power supply means, a transformer having a pair of windings, means coupling one of said windings between said collector electrode and said power supply means, a capacitor, resistance means, and means coupling said capacitor, said resistance means, and the other of said transformer windings in series between said base electrode and said power supply means for periodically rendering said transistor highly conductive and rapidly changing the charge of said capacitor with the charge of said capacitor being gradually changed between intervals of conduction of said transistor, and coupling means connected to a point between said resistance means and said other of said transformer windings for applying said large amplitude pulses to said electron gun structure for blanking said picture tube during vertical retrace time intervals.

4. In a television circuit including a picture tube having an electron gun structure for producing an electron beam, and horizontal and vertical deflection means for deflecting said beam, said electron gun structure including a control grid, horizontal and vertical deflection circuits for operating said horizontal and vertical deflection means, said vertical deflection circuit including a vertical output stage, a vertical driver stage for applying a signal to said output stage, and a vertical oscillator stage for supplying a sawtooth signal to said driver stage, said vertical oscillator stage including a transistor having base, emitter and collector electrodes, a transformer having first and second windings, and means coupling said first winding in circuit with said collector electrode and said second winding in circuit with said base electrode with large amplitude negative pulses being developed at one end of said second winding during conduction of said transistor, coupling means for applying said large amplitude negative pulses to said control grid of said picture tube, and said driver stage including a transistor operated as an emitter-follower for presenting a high impedance to said vertical oscillator stage.

5. In a television circuit including a picture tube having an electron gun structure for producing an electron beam and horizontal and vertical deflection means for deflecting said beam, horizontal and vertical deflection circuits for operating said horizontal and vertical deflection means, said vertical deflection circiut including a vertical output stage and a vertical oscillator stage for supplying a signal to said vertical output stage and operative to develop large amplitude pulses during vertical retrace time intervals, said vertical oscillator including a control element having a control electrode and first and second power electrodes and operated as a blocking oscillator, a transformer having first and second windings, and means coupling said first winding in circuit with one of said power electrodes and said second winding in circuit with said control electrode, said second winding having a substantially larger number of turns than said first winding to develop said large amplitude pulses across said second winding during conduction of said transistor, and coupling means connected in circuit with said second winding for applying said large amplitude pulses to said electron gun structure for blanking said picture tube during vertical retrace time intervals.

6. In a television circuit as defined in claim 5, means for applying synchronizing pulses to said control electrode, and isolation diode means connected between said second transformer winding and said control electrode for operating during conduction of said control means to apply a signal from said second winding to said control electrode while substantially isolating said synchronizing means from said second winding when said control element is non-conductive.

7. In a television circuit including a picture tube having an electron gun structure for producing an electron beam and horizontal and vertical for producing an electron beam and horizontal and vertical deflection means for deflecting said beam, DC power supply means, horizontal and vertical deflection circuits for operating said horizontal and vertical deflection means, said vertical deflection circuit including a vertical output stage and a vertical oscillator stage for applying a signal to said vertical output stage and being operative to develop large amplitude pulses during vertical retrace time intervals, said vertical oscillator including a control element having a control electrode and first and second power electrodes and operated as a blocking oscillator, means connecting said first power electrode to said power supply means, a transformer having a pair of windings, means coupling one of said windings between said second power electrode and said power supply means, a capacitor, resistance means, and means coupling said capacitor, said resistance means, and the other of said transformer windings in series between said control electrode and said power supply means for periodically rendering said control element highly conductive and rapidly changing the charge of said capacitor with the charge of said capacitor being gradually changed between intervals of conduction of said control element, and coupling means connected to a point between said resistance means and said other of said transformer windings for applying said large amplitude pulses to said electron gun structure for blanking said picture tube during vertical retrace time intervals.

References Cited

UNITED STATES PATENTS 2,607,847 8/1952 Heisig -------------- 178—7.5

OTHER REFERENCES

Towers: Transistor Television Receivers, pp. 112–115 (1963).

JOHN W. CALDWELL, Primary Examiner

R. L. RICHARDSON, Assistant Examiner

U.S. Cl. X.R.

315—22; 331—149

UNITED STATES PATENT OFFICE
CERTIFICATE OF CORRECTION

Patent No. 3,497,615 February 24, 1970

George A. Kent et al.

It is certified that error appears in the above identified patent and that said Letters Patent are hereby corrected as shown below:

Column 5, line 35, "active" should read -- action --; Column 9, line 15, "circiut" should read -- circuit --; lines 42 and 43, cancel "for producing an electron beam and horizontal and vertical".

Signed and sealed this 15th day of September 1970.

(SEAL)
Attest:

Edward M. Fletcher, Jr.
Attesting Officer

WILLIAM E. SCHUYLER, JR.
Commissioner of Patents